Patented Dec. 14, 1948

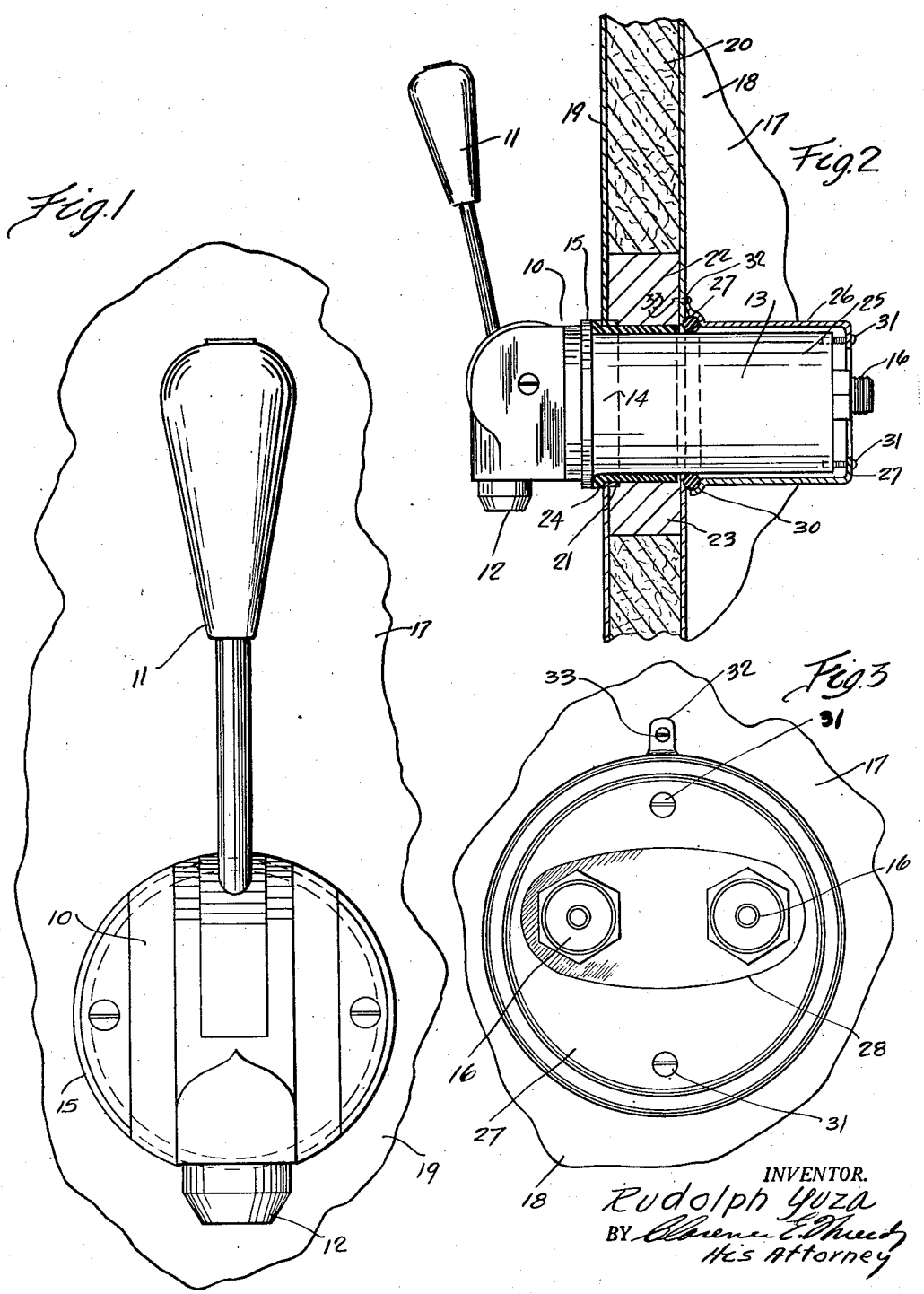

2,456,165

UNITED STATES PATENT OFFICE 2,456,165

VALVE MOUNTING

Rudolph Yuza, Chicago, Ill., assignor to A. Dalkin Company, Chicago, Ill., a corporation of Illinois Application March 19, 1945, Serial No. 583,574

2 Claims. (Cl. 137—69)

This invention relates to valve mountings and more particularly to a mounting for a valve of a liquid dispensing apparatus wherein it is essential for effective refrigeration that an opening in the wall through which the valve body is projected, be properly sealed to prevent the loss of refrigeration.

The invention has for its principal object the provision of a construction of this character which will be highly efficient in use and economical in manufacture.

As a further object the invention contemplates a valve mounting which affords expeditious assembly without the employment of complicated tools or other mechanical instruments.

A still further and equally important object of the invention is the provision in the valve mounting of means for effectively sealing the valve body in the opening of a wall with which it is associated.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a front elevational view of the invention;

Fig. 2 is a vertical sectional detail view of the same;

Fig. 3 is a rear view of the invention as illustrated in Fig. 1.

The drawings illustrate the preferred form of construction by which the several objects of my invention are accomplished. In this connection, 10 indicates a valve structure which includes a handle 11 and a discharge spout 12. This valve structure, as illustrated in the drawings, comprises a cylindrical body 13 which houses the valve mechanism. At the forward end portion 14 of this body 13 is an annular flange 15. Extending from the body 13 are the inlet plugs or couplings 16.

This valve structure is adapted to be associated with a wall 17 of a refrigerator or dispensing apparatus. This wall 17 includes an inner shell 18 and an outer shell 19 between which is deposited a suitable insulating material 20. An opening 21 is formed in the wall 17, and this opening is defined by a plug 22 mounted between the inner and outer shells 18 and 19, respectively, as best shown in Fig. 2.

Confined in this opening 21 is a rubber insert 23 which embraces the medial portion of the body 13. This rubber insert is provided with an annular flange 24 which is disposed between the flange 15 and the shell of the wall 17.

Disposed over the inner end portion 25 of the body 13 is a sealing cap 26. This sealing cap 26 in its rear wall 27, is provided with an opening 28 for the projection of the fittings 16. The sealing cap 26 is provided at its forward end portion with a ring-like groove or recess 29, and mounted in this recess 29 is a rubber sealing ring 30, the ring 30 bearing against the inner shell 18 adjacent the opening 21. The cap 26 is secured to the body 13 by screw elements 31. These screw elements 31 serve to draw the cap and valve structure toward each other so as to bear the flange 15 against the flange 24 of the rubber insert 23 and to bear the sealing ring 30 against the inside surface of the wall 17, thereby to effectively seal the opening 21, for reasons hereinbefore set forth.

To complete the invention and to guard against the rotation of the cap 26, and consequently the rotation of the body 13, the latter within the opening 21, I provide as an integral part of the cap a lip 32, and projected through an opening formed in this lip 32 is a connecting screw 33 threaded into the plug 22 as shown in Fig. 2. The simplicity of the invention is apparent from the foregoing description.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A mounting for a valve structure having an elongated body, comprising a wall having an opening formed therein, a resilient insert in said opening and adapted to embrace the medial portion of said body, a sealing cap having a ring-like recess formed in one end thereof and embracing an end portion of the body, said sealing cap including a resilient sealing ring encircling the body adjacent said medial portion and seated in said recess and adapted to bear against said wall adjacent the opening, and means for connecting said cap to said body for bearing said sealing ring against said wall.

2. A mounting for a valve having an annular flange and an elongated body extending from said flange comprising a wall having an opening formed therein through which said body is projected with an end portion extending beyond the rear face of said wall, a resilient insert in said opening and having an annular flange disposed between the front face of the wall and the annular flange of said valve and embracing said body, a cap disposed over said end portion of the body extending beyond the rear face of said wall and including a resilient sealing ring encircling the body in bearing relation with respect to the rear face of said wall, and screw elements for connecting said cap to said body and for bearing the flange of the insert and the ring against the adjacent sides of said wall adjacent said opening.

RUDOLPH YUZA.

REFERENCES CITED

The following references are of record in the file of this patent:

UNITED STATES PATENTS

| Number | Name | Date |
|---|---|---|
| 548,706 | Gundermann | Oct. 29, 1895 |
| 1,602,544 | Muend | Oct. 12, 1926 |
| 2,225,693 | Frances | Dec. 24, 1940 |

FOREIGN PATENTS

| Number | Country | Date |
|---|---|---|
| 97,780 | Sweden | Jan. 9, 1940 |